United States Patent
No et al.

(10) Patent No.: US 12,459,589 B2
(45) Date of Patent: Nov. 4, 2025

(54) THEFT PREVENTION SYSTEM OF ELECTRIC BICYCLE AND CONTROL METHOD THEREOF

(71) Applicant: HL MANDO CORPORATION, Gyeonggi-Do (KR)

(72) Inventors: Eun Jung No, Gyeonggi-do (KR); Bumrae Cho, Gyeonggi-do (KR); Seongjoo Moon, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 18/099,928

(22) Filed: Jan. 21, 2023

(65) Prior Publication Data
US 2023/0234660 A1    Jul. 27, 2023

(30) Foreign Application Priority Data
Jan. 26, 2022   (KR) .................. 10-2022-0011261

(51) Int. Cl.
*B62H 5/20*    (2006.01)
*B62J 3/10*    (2020.01)
(Continued)

(52) U.S. Cl.
CPC .............. *B62H 5/20* (2013.01); *B62J 3/10* (2020.02); *B62M 6/50* (2013.01); *G08B 21/24* (2013.01)

(58) Field of Classification Search
CPC ...... B62H 5/20; B62H 5/14; B62J 3/10; B62J 3/00; B62J 45/413; B62M 6/50;
(Continued)

(56) References Cited

U.S. PATENT DOCUMENTS

| | | | |
|---|---|---|---|
| 2012/0146429 A1* | 6/2012 | Seol .................. | B62M 6/90 307/116 |
| 2019/0173399 A1* | 6/2019 | Lin .................. | H02P 3/025 |

(Continued)

FOREIGN PATENT DOCUMENTS

| | | |
|---|---|---|
| JP | 2002-321673 | 11/2002 |
| KR | 10-2011-0007069 | 1/2011 |

OTHER PUBLICATIONS

Office Action dated Sep. 27, 2025 for Chinese Patent Application No. 202310056802.3 and its English translation from Global Dossier.

*Primary Examiner* — Brian Wilson
(74) *Attorney, Agent, or Firm* — WOMBLE BOND DICKINSON (US) LLP (57) ABSTRACT

An electric bicycle theft prevention system for preventing theft of an electric bicycle according to an embodiment of the present disclosure includes a motor unit, a sensor unit, a controller, and an alarm unit. The motor unit is a permanent magnet synchronous motor (PMSM), and is configured to rotate wheels of the electric bicycle by receiving power from an electric storage unit. The sensor unit is configured to detect a position of a rotation shaft or a rotor of the motor unit. The controller is configured to control the motor unit and the sensor unit. The alarm unit is configured to generate an alarm by an electrical signal of the control unit. In addition, when a theft prevention function is activated in an unused state of the electric bicycle, the controller monitors a sensor value of the sensor unit to detect a movement of the electric bicycle.

An electric bicycle theft prevention control method of an electric bicycle theft prevention system for preventing theft of an electric bicycle according to an embodiment of the present disclosure includes a theft prevention function activating operation, an electric bicycle movement detecting operation, an alarm operating and wheel locking operation, an alarm operation and wheel lock cancelling operation. In the theft prevention function activating operation, a theft prevention function of the electric bicycle is activated by a user in an unused state of the electric bicycle. In the electric bicycle movement detecting operation, a controller monitors a sensor value of a sensor unit to detect a movement of the electric bicycle after the theft prevention function is activated. In the alarm operating and wheel locking operation, when the controller determines that the electric bicycle is moving in the electric bicycle movement detecting operation, an alarm is operated and wheels of the electric bicycle are locked. In the alarm operation and wheel lock cancelling operation, the controller detects whether the sensor value of the sensor unit is greater than a predetermined set value in
(Continued)

the alarm operating and wheel locking operation, and when it is detected that the sensor value of the sensor unit is smaller than the predetermined set value, the alarm operation and wheel lock are cancelled.

11 Claims, 3 Drawing Sheets

(51) Int. Cl.
 *B62M 6/50* (2010.01)
 *G08B 21/24* (2006.01)
(58) Field of Classification Search
 CPC .... G08B 21/24; G08B 13/1436; B60R 25/30; B60R 25/10
 See application file for complete search history.

(56) References Cited

U.S. PATENT DOCUMENTS

2020/0108882 A1* 4/2020 Weigel .................... B62M 6/45
2020/0382032 A1* 12/2020 Takase .................... H02P 21/05

* cited by examiner

THEFT PREVENTION SYSTEM OF ELECTRIC BICYCLE AND CONTROL METHOD THEREOF

CROSS-REFERENCE TO RELATED APPLICATION

This application claims the benefit of Korean Patent Application No. 10-2022-0011261 filed on Jan. 26, 2022, in the Korean Intellectual Property Office, the entire disclosure of which is incorporated herein by reference for all purposes.

BACKGROUND

1. Field of the Invention

One or more example embodiments relate to an electric bicycle theft prevention system, and more particularly, to an electric bicycle theft prevention system and a control method thereof capable of preventing theft of an electric bicycle by stopping driving of an AC motor so that the wheels of the electric bicycle do not rotate by external power.

2. Description of the Related Art

In general, an electric bicycle includes a motor for rotating the wheels and a battery for supplying power to the motor.

The electric bicycle is driven in such a way that the wheels are rotated by a motor or assists a user with the force of pedaling. In such an electric bicycle, when a driver operates a throttle, which is an acceleration means located on a handle, the motor rotates, and the wheels rotate by the rotation of the motor so that the bicycle moves forward.

There is an issue in that the electric bicycle is vulnerable to theft while the user does not use it.

PRIOR ART DOCUMENT

Patent Document

Korean Patent Application Publication No. 10-2011-0007069 (published on Jan. 21, 2011)

SUMMARY

Accordingly, an object of the present disclosure for solving the above described issues is to provide an electric bicycle theft prevention system and a control method thereof that locks the wheels to prevent the electric bike from being dragged when theft is detected when the electric bike is not in use.

However, the issues to be solved by the present disclosure are not limited to those described above, and may be variously expanded without departing from the spirit and scope of the present disclosure.

Example embodiments provide an electric bicycle theft prevention system and a control method thereof, which use a permanent magnet synchronous motor (PMSM), use the d-axis current of the motor as a signal used to lock the wheels of the electric bicycle, and prevents the wheels of the electric bicycle from rotating with external power by controlling the magnetic flux using the d-axis current.

According to an aspect, there is provided an electric bicycle theft prevention system for preventing theft of an electric bicycle, including a motor unit, a sensor unit, a controller and an alarm unit. The motor unit is a permanent magnet synchronous motor (PMSM), and is configured to rotate wheels of the electric bicycle by receiving power from an electric storage unit. The sensor unit is configured to detect a position of a rotation shaft or a rotor of the motor unit. The controller is configured to control the motor unit and the sensor unit. The alarm unit is configured to generate an alarm by an electrical signal of the control unit. In addition, when a theft prevention function is activated in an unused state of the electric bicycle, the controller monitors a sensor value of the sensor unit to detect a movement of the electric bicycle.

According to an example embodiment, when the controller detects that the sensor value of the sensor unit is less than a predetermined value, the controller determines that the electric bicycle is not moving and continues to monitor the sensor value of the sensor unit.

According to an example embodiment, when the controller detects that the sensor value of the sensor unit is equal to or greater than a predetermined value, the controller determines that the electric bicycle is moving and makes the alarm unit generate an alarm.

According to an example embodiment, when the alarm is generated, the controller controls magnitudes of a d-axis current and a q-axis current of the motor unit to be predetermined values.

According to an example embodiment, the controller controls the magnitude of the d-axis current of the motor unit to be a first set value, and controls the magnitude of the q-axis current of the motor unit to be a second set value.

According to an example embodiment, the controller detects whether the sensor value of the sensor unit is greater than a third set value, and when it is detected that the sensor value of the sensor unit is equal to the third set value or greater than the third set value, the controller determines that an external force is continuously applied to the electric bicycle and makes the alarm unit continuously generate an alarm.

According to an example embodiment, when the alarm is continuously generated, the controller controls so that the magnitude of the d-axis current of the motor unit is continuously maintained at the first set value, and controls so that the magnitude of the q-axis current of the motor unit is continuously maintained at the second set value.

According to an example embodiment, when it is detected that the sensor value of the sensor unit is smaller than the third set value, the controller determines that no external force is applied to the electric bicycle and cancels an alarm operation and wheel lock.

According to an aspect, there is provided an electric bicycle theft prevention control method of an electric bicycle theft prevention system for preventing theft of an electric bicycle, including a theft prevention function activating operation, an electric bicycle movement detecting operation, an alarm operating and wheel locking operation, an alarm operation and wheel lock cancelling operation. In the theft prevention function activating operation, a theft prevention function of the electric bicycle is activated by a user in an unused state of the electric bicycle. In the electric bicycle movement detecting operation, a controller monitors a sensor value of a sensor unit to detect a movement of the electric bicycle after the theft prevention function is activated. In the alarm operating and wheel locking operation, when the controller determines that the electric bicycle is moving in the electric bicycle movement detecting operation, an alarm is operated and wheels of the electric bicycle are locked. In the alarm operation and wheel lock cancelling operation, the controller detects whether the sensor value of the sensor unit is greater than a predetermined set value in the alarm operating and wheel locking operation, and when it is detected that the sensor value of the sensor unit is smaller than the predetermined set value, the alarm operation and wheel lock are cancelled.

According to an example embodiment, in the electric bicycle movement detecting operation, when the controller detects that the sensor value of the sensor unit is equal to or greater than a predetermined value, the controller determines that the electric bicycle is moving.

According to an example embodiment, in the electric bicycle movement detecting operation, when the controller detects that the sensor value of the sensor unit is less than a predetermined value, the controller determines that the electric bicycle is not moving and continues to monitor the sensor value of the sensor unit.

According to an example embodiment, in the alarm operating and wheel locking operation, when the alarm is operated, the controller controls magnitudes of a d-axis current and a q-axis current of a motor unit to be predetermined values.

According to an example embodiment, in the alarm operating and wheel locking operation, the controller controls the magnitude of the d-axis current of the motor unit to be a first set value, and controls the magnitude of the q-axis current of the motor unit to be a second set value.

According to an example embodiment, in the alarm operating and wheel locking operation, the controller detects whether the sensor value of the sensor unit is greater than a third set value, and when it is detected that the sensor value of the sensor unit is equal to the third set value or greater than the third set value, the controller determines that an external force is continuously applied to the electric bicycle and makes the alarm unit continuously generate an alarm.

According to an example embodiment, in the alarm operating and wheel locking operation, when the alarm is continuously generated, the controller controls so that the magnitude of the d-axis current of the motor unit is continuously maintained at the first set value, and controls so that the magnitude of the q-axis current of the motor unit is continuously maintained at the second set value.

According to an example embodiment, in the alarm operation and wheel lock cancelling operation, the controller detects whether the sensor value of the sensor unit is greater than a third set value, and when it is detected that the sensor value of the sensor unit is smaller than the third set value, the controller determines that no external force is applied to the electric bicycle, and cancels an alarm operation and wheel lock.

Additional aspects of example embodiments will be set forth in part in the description which follows and, in part, will be apparent from the description, or may be learned by practice of the disclosure.

According to example embodiments, the electric bicycle theft prevention system and the control method thereof may prevent theft even when a user does not have a separate external locking device on the electric bicycle.

In addition, it is possible to prevent damage due to theft of the electric bicycle.

However, the effects of the present disclosure are not limited to the above effects, and may be variously expanded without departing from the spirit and scope of the present disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments of the present disclosure will be described in more detail with reference to the accompanying drawings. Among the components of the present disclosure, specific descriptions thereof will be omitted so as not to obscure the gist of the present disclosure, which may be clearly understood by one skilled in the art and easily reproduced by the prior art.

Hereinafter, an electric bicycle theft prevention system and a control method thereof according to an example embodiment of the present disclosure will be described.

First, an electric bicycle theft prevention system according to an example embodiment of the present disclosure will be described.

Figure 1:
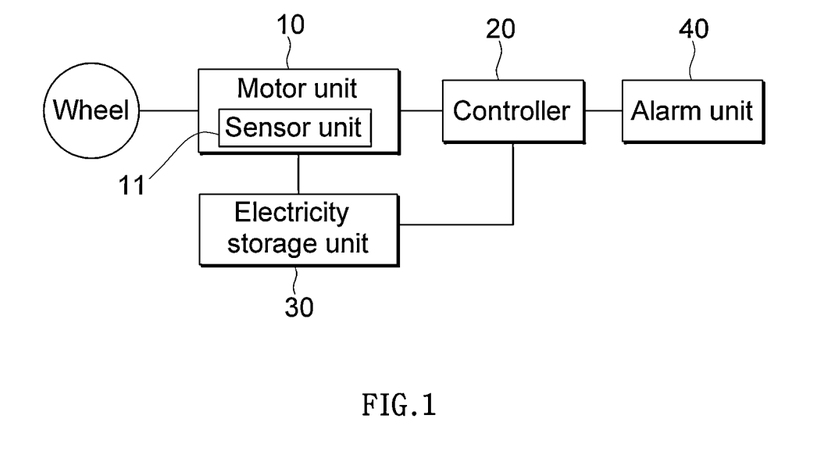
FIG. 1 is a block diagram schematically illustrating an electric bicycle theft prevention system according to an example embodiment.

FIG. 1 is a block diagram schematically illustrating an electric bicycle theft prevention system according to an example embodiment.

Referring to FIG. 1, an electric bicycle theft prevention system according to an example embodiment of the present disclosure is an electric bicycle theft prevention system for preventing theft of an electric bicycle, which includes a motor unit 10, a sensor unit 11, a controller 20, and an alarm unit 40. The motor unit 10 is a permanent magnet synchronous motor (PMSM), and may receive power from an electricity storage unit 30 to rotate the wheels of the electric bicycle. The sensor unit 11 may detect a position of a rotation shaft or a rotor of the motor unit 10. The controller 20 may control the motor unit 10 and the sensor unit 11. The alarm unit 40 may generate an alarm by an electrical signal from the controller 20. Hereinafter, each component will be described in detail.

The motor unit 10 is a power source for rotating the wheels of the electric bicycle.

The motor unit 10 is directly or indirectly connected to the wheel of the electric bicycle, and when the rotation shaft of the motor unit 10 rotates, the wheel rotates. The electric bicycle moves by the rotation of the wheels.

The electric bicycle theft prevention system according to an example embodiment of the present disclosure includes an electricity storage unit 30. The motor unit 10 is electrically connected to the electricity storage unit 30 (a kind of battery), and is driven by receiving power from the electricity storage unit 30.

The electricity storage unit 30 is disposed in the electric bicycle and may be separated from the electric bicycle. The user may charge the electricity storage unit 30 after separating (removing) the electricity storage unit 30 from the electric bicycle, and by fastening (attaching) the charged electricity storage unit 30 to the electric bicycle, power may be supplied to the motor unit 10.

The motor unit 10 of the electric bicycle theft prevention system according to an example embodiment of the present disclosure may be a permanent magnet synchronous motor (PMSM). Here, the PMSM refers to a brushless AC motor. Since the PMSM is a motor widely used in the prior art, a detailed description of the components and operation method of the motor will be omitted.

The PMSM may express the physical quantity of the motor using two variables by converting the coordinate system expressed in U, V, and W phases into a d-q-axis orthogonal coordinate system, and instantaneous control is possible.

The d-axis is an axis on which the magnetic flux of the motor normally occurs, and is selected as the direction of the magnetic flux generated from the U-phase winding of the stator. The d-axis is a reference axis in vector control. In addition, the magnetic flux (magnetic flux of the motor) may be controlled by controlling the d-axis current.

When the d-axis current is applied, magnetic flux is generated. In other words, the magnitude of the magnetic flux may be adjusted by adjusting the magnitude of the d-axis current. It is possible to prevent the wheel from rotating by increasing the magnitude of the magnetic flux of the motor. When the magnitude of the d-axis current is increased to a predetermined value, the magnitude of the magnetic flux is increased, and the rotation shaft or the rotor of the motor may not rotate due to the strong magnetic flux, and thus the wheel connected to the motor unit 10 may not rotate.

The q-axis is orthogonal to the d-axis, and is the axis of current that generates torque in vector control. Therefore, in the case of current control (torque control), the q-axis is controlled. In other words, the torque (torque of the motor) may be controlled by controlling the q-axis current.

When the q-axis current is applied, torque is generated in the motor. In other words, it is possible to adjust the magnitude of the torque of the motor by adjusting the magnitude of the q-axis current. By increasing the magnitude of the torque of the motor, the wheel may be rotated quickly. When the magnitude of the q-axis current is increased to a predetermined value, the magnitude of the torque becomes high, and the wheel of the electric bicycle rotates faster by the strong torque. The torque of the motor is a rotation torque, and the wheel rotates by the rotation torque. Therefore, in order to prevent theft of the electric bicycle, the q-axis current should not be applied when the theft of the electric bicycle is detected. In other words, the q-axis current should not be applied to generate rotation torque in the motor.

If the q-axis current is not applied, no torque is generated in the motor. In other words, if the q-axis current is not applied, no rotation torque is generated in the motor, and the rotation shaft of the motor does not rotate. Accordingly, the wheel of the electric bicycle does not rotate by the driving of the motor (rotation torque of the motor). However, in this case, the wheel of the electric bicycle may be rotated by external power (force).

The motor unit 10 of the electric bicycle theft prevention system according to an example embodiment of the present disclosure uses a PMSM, and uses the d-axis current as a signal used to lock the wheel of the electric bicycle. By controlling the magnetic flux using the d-axis current, it is possible to prevent the wheel of the electric bicycle from rotating even with external power (force).

Figure 2:
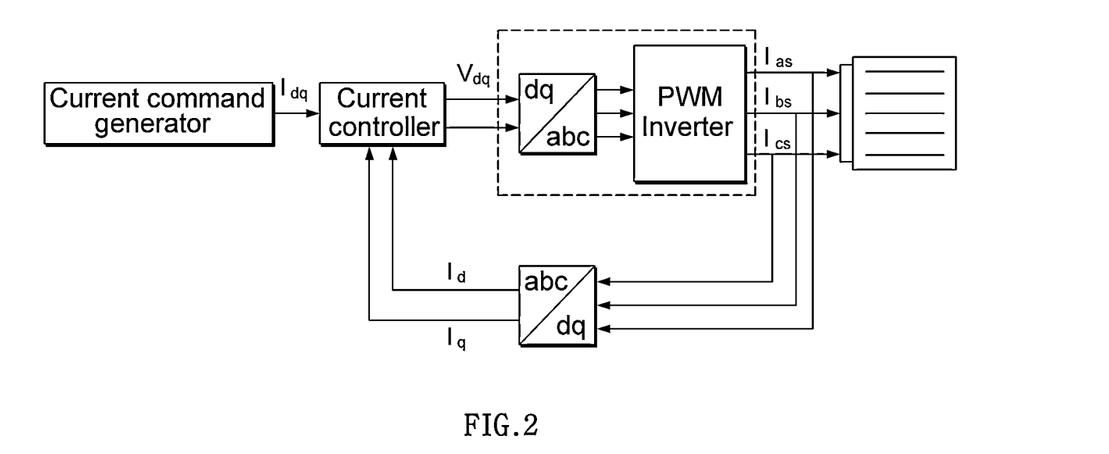
FIG. 2 is a control configuration diagram for d-axis current control of a motor unit (PMSM)

FIG. 2 is a control configuration diagram for d-axis current control of a motor unit (PMSM).

Referring to FIGS. 1 and 2, the motor unit 10 may include a current command generator, a current controller, a synchronous coordinate converter, a dq inverse converter, and an inverter unit for d-axis current control. In addition, according to an example embodiment of the present disclosure, the current command generator, the current controller, the synchronous coordinate converter, the dq inverse converter, and the inverter may be included in the controller 20 for d-axis current control.

The current command generator generates a d-q-axis current command for electric motor control. Here, the electric motor refers to a permanent magnet synchronous motor (PMSM) used in an electric bicycle.

The current controller receives the generated d-q-axis current command and generates a control signal to control the driving of the electric motor.

The synchronous coordinate converter converts an AC current input according to an AC voltage applied to the electric motor into a d-q current of the synchronous coordinate system. Specifically, PMSM rotates the motor through three-phase (U, V, W-phase) current, and converts it to the d-q axis for control.

The dq inverse converter converts the d-q current into a three-phase current in order to apply the current to the three-phase motor.

A PWM inverter is a power conversion device that converts a DC voltage into a three-phase AC voltage.

The overall process of dq conversion is as follows. It senses the U, V, W three phases from the current sensor of the PMSM, and first converts it into two axes of the stationary coordinate system. Then, it is converted into a rotation coordinate system and converted into a d-q-axis current state. The current controller generates d-q current output through the d-q-axis current command and the sensed d-q-axis current. And in order to apply a current to the three-phase motor, the d-q component is converted back to three-phase through d-q inverse conversion.

The sensor unit 11 may be a position sensor (angle sensor) mounted (embedded) in the motor unit 10. The sensor unit 11 may be embedded in the motor unit 10 for motor control.

The sensor unit 11 may detect a position of a rotation shaft or a rotor of the motor unit 10. Here, the position of the rotation shaft or the rotor may be a rotation angle of the rotation shaft or the rotor.

The sensor unit 11 may be electrically connected to the controller 20.

The sensor unit 11 may transmit the sensed (measured) sensor value to the controller 20. Specifically, the sensor unit 11 may transmit the sensed (measured) position value of the rotation shaft or the rotor of the motor unit 10 to the controller 20. Here, the position value of the rotation shaft or the rotor may be a rotation angle value of the rotation shaft or the rotor.

The controller 20 may be electrically connected to the motor unit 10 and may control the motor unit 10.

In addition, the controller 20 may be electrically connected to the electricity storage unit 30 and may control the electricity storage unit 30.

By controlling the electricity storage unit 30, the controller 20 may supply or cut off the electricity stored in the electricity storage unit 30 to the motor unit 10.

By controlling the electricity storage unit 30, the controller 20 may control the magnitudes of the d-axis current and the q-axis current of the motor unit 10 to be predetermined values.

The controller 20 may include a storage unit (e.g., a memory chip) storing various set values, a substrate (PCB), and various electronic components. In addition, the controller 20 may include a program in which calculation and comparison algorithms are embedded.

The controller 20 may lock the wheels of the electric bicycle when a theft situation is detected when the electric bicycle is not in use. Locking the wheel of an electric bicycle means preventing the wheel from rotating. This is possible by controlling the motor unit 10 connected to the wheel of the electric bicycle to prevent the rotation shaft of the motor from rotating. The explanation for this is as follows.

Figure 3:
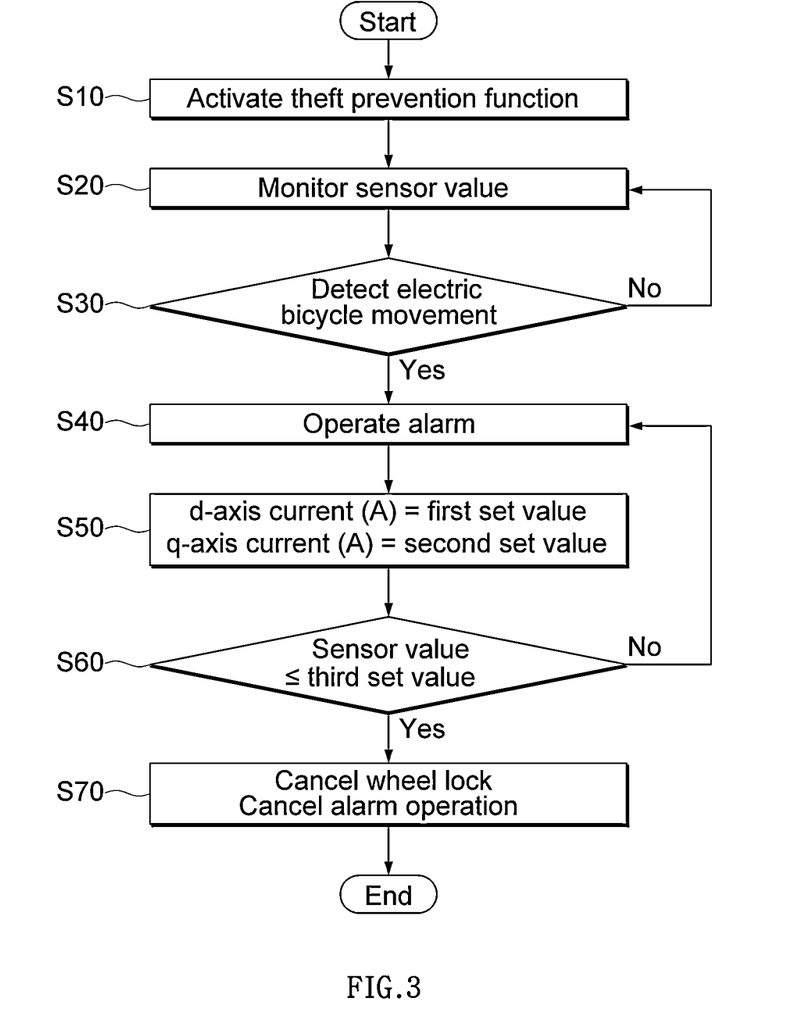
FIG. 3 is a flowchart illustrating a method in which a controller prevents theft of an electric bicycle.
Figure 4:
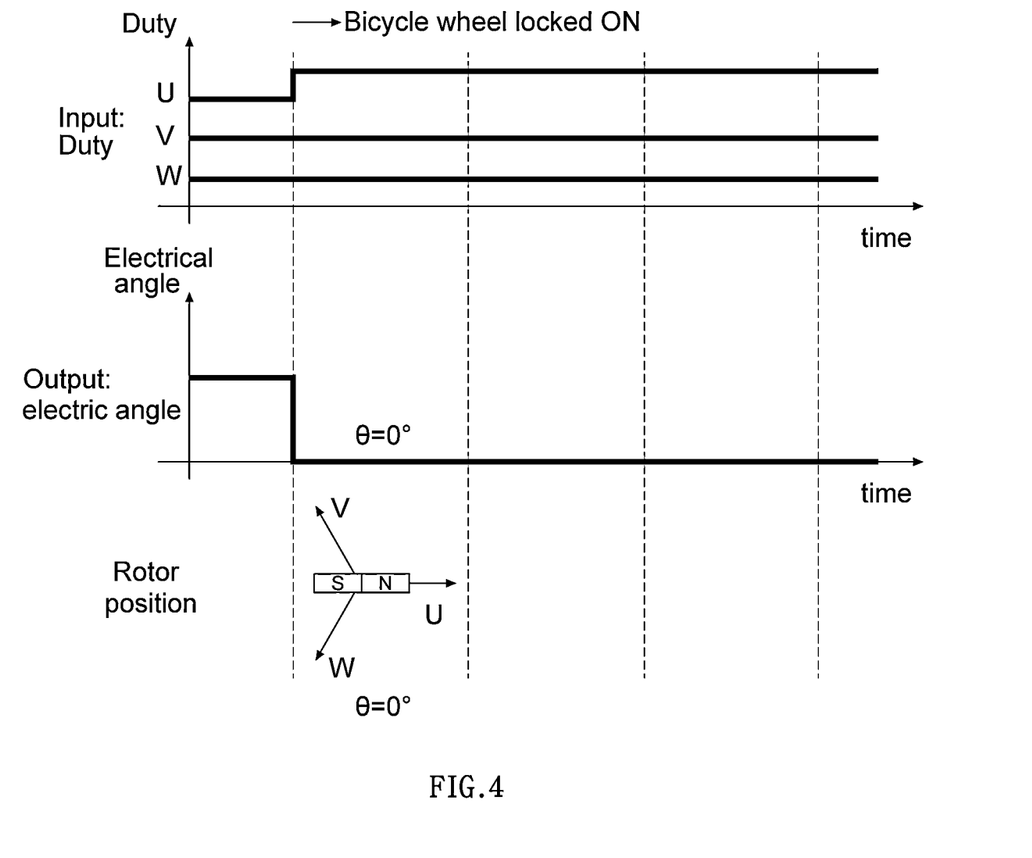
FIG. 4 is a diagram illustrating a duty value according to time of a motor unit, a position value (rotation angle value) of a rotor, and a position of the rotor.

FIG. 3 is a flowchart illustrating a method in which a controller prevents theft of an electric bicycle, and FIG. 4 is a diagram illustrating a duty value according to time of a motor unit, a position value (rotation angle value) of a rotor, and a position of the rotor.

Referring to FIGS. 1 to 4, the user may activate the theft prevention function in an unused state of not using the electric bicycle S10. According to an example embodiment of the present disclosure, activation of the theft prevention function is possible by operating an activation mechanism such as a button mounted on the handle or body of the electric bicycle.

When the user activates the theft prevention function, the controller 20 may monitor the sensor value of the sensor unit 11 S20. Here, the sensor value of the sensor unit 11 may be a position value (rotation angle value) of the rotation shaft or the rotor of the motor unit 10.

The controller 20 may monitor the sensor value of the sensor unit 11 to detect the movement of the electric bicycle S30. Here, the movement of the electric bicycle indicates that the wheels of the electric bicycle rotate. In addition, the movement of the electric bicycle indicates the theft situation of the electric bicycle. In other words, the rotation of the wheels of the electric bicycle while the theft prevention function is activated indicates the theft situation of the electric bicycle.

When it is detected that the sensor value of the sensor unit 11 is equal to or greater than a predetermined value, the controller 20 may determine that the electric bicycle is moving S30 and activate an alarm S40. Here, a predetermined sensor value may be set in the controller 20 by a user. The alarm is generated by the alarm unit 40 to be described below.

In addition, when it is detected that the sensor value of the sensor unit 11 is less than a predetermined value, the controller 20 may determine that the electric bicycle is not moving S30, and continue to monitor the sensor value of the sensor unit 11 S20.

When the alarm is operated S40, the controller 20 may control the magnitudes of the d-axis current and the q-axis current of the motor unit 10 to be predetermined values S50. When the controller 20 controls the magnitudes of the d-axis current and the q-axis current of the motor unit 10 to be predetermined values, it means locking the wheel of the electric bicycle. In other words, in this state, the wheel of the electric bicycle may not rotate.

Specifically, the controller 20 may control the magnitude of the d-axis current of the motor unit 10 to be a first set value S50. When the magnitude of the d-axis current is the first set value, the magnitude of the magnetic flux becomes high, and the rotation shaft or the rotor of the motor may not rotate due to the strong magnetic flux. As a result, the wheel of the electric bicycle connected to the motor unit 10 does not rotate. FIG. 4 illustrates a rotor position. The rotor is fixed on the stator U by the magnetic flux.

The electric bicycle theft prevention system according to an example embodiment of the present disclosure may require a separate component so that the magnitude of the d-axis current becomes the first set value. This is because, according to an example embodiment of the present disclosure, a large current of 50 A or more may be required as the first set value. The user may set a first set value in the controller 20, and may set 50 A or more as the first set value.

In addition, the controller 20 may control the magnitude of the q-axis current of the motor unit 10 to be a second set value S50. When the magnitude of the q-axis current is the second set value, no rotation torque is generated in the motor unit 10, and the rotation shaft or the rotor of the motor does not rotate. Accordingly, the wheel of the electric bicycle does not rotate by the driving of the motor (rotation torque of the motor).

The electric bicycle theft prevention system according to an example embodiment of the present disclosure may prevent the q-axis current from being applied so that torque (rotation torque) does not occur in the motor unit 10. The user may set the second set value in the controller 20 and may set 0 as the second set value.

In a state in which the magnitudes of the d-axis current and the q-axis current of the motor unit 10 are controlled to be predetermined values S50, the controller 20 may detect whether the sensor value of the sensor unit 11 is greater than the third set value S60. Here, the third set value may be a position value (rotation angle value) of the rotation shaft or the rotor of the motor unit 10. The user may set the third set value in the controller 20. According to an example embodiment of the present disclosure, the third set value may be 10 degrees (rotation angle) or less.

Specifically, when it is detected that the sensor value of the sensor unit 11 is equal to the third set value (e.g., 10 degrees) or greater than the third set value (e.g., 10 degrees) S60, the controller 20 may determine that an external force is continuously applied to the electric bicycle so that the electric bicycle moves (such that the wheel of the electric bicycle rotate) S60, and may continue to operate the alarm S40. Then, when the alarm continues to operate S40, the controller 20 may control the magnitudes of the d-axis current and the q-axis current of the motor unit 10 to be continuously maintained at predetermined values S50. In FIG. 4 illustrates that the magnitude of the d-axis current of the motor unit 10 continues to be maintained at the first set value, and the magnitude of the q-axis current continues to be maintained at the second set value, so that the magnetic flux continues to be generated in the stator U-phase winding, and that the position value (rotation angle value) of the rotation shaft or the rotor of the motor unit 10 is maintained at 0 degrees. Since the controller 20 continues to control the magnitudes of the d-axis current and the q-axis current of the motor unit 10 to become predetermined values, the wheel of the electric bicycle remain locked and may not rotate.

In addition, when it is detected that the sensor value of the sensor unit 11 is smaller than the third set value (e.g., 10 degrees) S60, the controller 20 may determine that no external force is applied to the electric bicycle S60, and may cancel the alarm operation and the wheel lock S70.

According to an example embodiment of the present disclosure, even in a state in which the alarm operation and the wheel lock is cancelled, the activation of the theft prevention function may be continuously maintained. According to an example embodiment of the present disclosure, the theft prevention function may not be activated only when the user operates an activation mechanism such as a button mounted on the handle or body of the electric bicycle to turn off the activation of the theft prevention function.

In addition, according to an example embodiment of the present disclosure, when it is determined that the electric bicycle is moving by detecting that the sensor value of the sensor unit 11 is equal to or greater than a predetermined value S30, the controller 20 may operate the alarm S40 and stop the rotation of the wheel at the same time S50. Further, in this case, it is possible to stop S50 the rotation of the wheel without operating S40 the alarm. Further, in this case, the alarm may be operated S40 after stopping S50 the rotation of the wheel.

The alarm unit 40 may be electrically connected to the controller 20.

The alarm unit 40 may generate an alarm by an electrical signal from the controller 20.

The controller 20 may control the alarm unit 40. Specifically, when the sensor value of the sensor unit 11 is equal to or greater than a predetermined value, the controller 20 may control the alarm unit 40 so that the alarm unit 40 generates an alarm. In addition, when the sensor value of the sensor unit 11 is greater than the third set value, the controller 20 may control the alarm unit 40 so that the alarm unit 40 generates an alarm. In FIG. 3, that the controller 20 operates the alarm S40 indicates that the controller 20 controls the alarm unit 40 so that the alarm unit 40 generates an alarm.

The alarm of the alarm unit 40 may be a warning sound such as a mechanical sound or a warning sound. The alarm unit 40 may include a speaker and various electronic components necessary to generate an alarm.

Hereinafter, an electric bicycle theft prevention control method of the electric bicycle theft prevention system according to an example embodiment of the present disclosure will be described.

Figure 5:
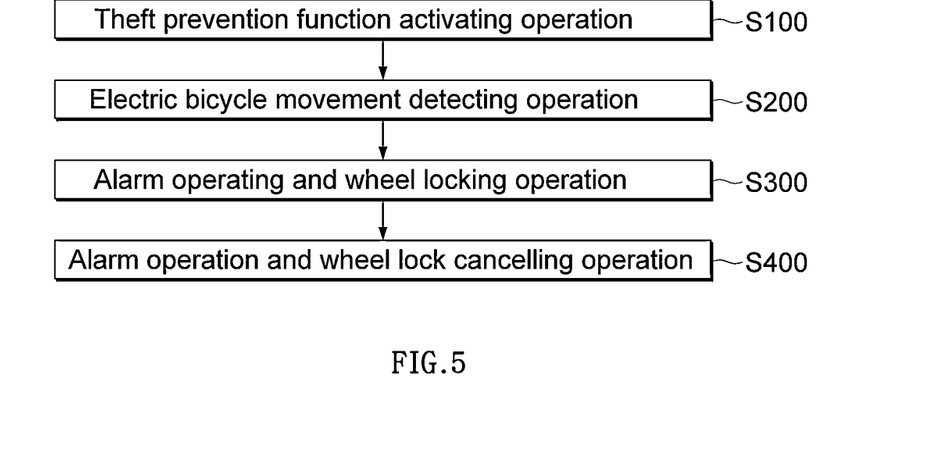
FIG. 5 is a flowchart illustrating an electric bicycle theft prevention control method of an electric bicycle theft prevention system according to an example embodiment.

FIG. 5 is a flowchart illustrating an electric bicycle theft prevention control method of an electric bicycle theft prevention system according to an example embodiment.

Referring to FIGS. 1 to 5, the electric bicycle theft prevention control method of the electric bicycle theft prevention system according to an example embodiment of the present disclosure includes a theft prevention function activating operation S100, an electric bicycle movement detecting operation S200, an alarm operating and wheel locking operation S300, an alarm operation and wheel lock cancelling operation S400.

The theft prevention function activating operation S100 refers to an operation in which the user activates the theft prevention function in an unused state in which the electric bicycle is not used. According to an example embodiment of the present disclosure, activation of the theft prevention function is possible by operating an activation mechanism such as a button mounted on the handle or body of the electric bicycle.

The electric bicycle movement detecting operation S200 refers to an operation in which the controller 20 monitors the sensor value of the sensor unit 11 to detect the movement of the electric bicycle after the theft prevention function is activated S100. Here, the sensor value of the sensor unit 11 may be a position value (rotation angle value) of the rotation shaft or the rotor of the motor unit 10. In addition, the movement of the electric bicycle indicates that the wheel of the electric bicycle is rotating, indicating the theft situation of the electric bicycle. In other words, the rotation of the wheel of the electric bicycle while the theft prevention function is activated indicates the theft situation of the electric bicycle.

Specifically, it is detected that the sensor value is greater than or equal to a predetermined value by monitoring the sensor value of the sensor unit 11, the controller 20 may determine that the electric bicycle is moving. In addition, when it is detected that the sensor value is less than a predetermined value by monitoring the sensor value of the sensor unit 11, the controller 20 may determine that the electric bicycle is not moving. Here, a predetermined sensor value may be set in the controller 20 by a user. When it is determined that the electric bicycle is not moving, the controller 20 may detect the movement of the electric bicycle by continuing to monitor the sensor value of the sensor unit 11.

The alarm operating and wheel locking operation S300 refers to an operation of operating an alarm and locking the wheel of the electric bicycle when the controller 20 determines that the electric bicycle is moving in the electric bicycle movement detecting operation S200. The alarm is generated in the alarm unit 40 by an electrical signal of the controller 20.

When the alarm is operated, the controller 20 may control the magnitudes of the d-axis current and the q-axis current of the motor unit 10 to be predetermined values. When the controller 20 controls the magnitudes of the d-axis current and the q-axis current of the motor unit 10 to be predetermined values, it means that the wheel of the electric bicycle is locked. In other words, in this state, the wheel of the electric bicycle may not rotate.

Specifically, the controller 20 may control the magnitude of the d-axis current of the motor unit 10 to be a first set value. When the magnitude of the d-axis current is the first set value, the magnitude of the magnetic flux becomes high, and the rotation shaft or the rotor of the motor may not rotate due to the strong magnetic flux. As a result, the wheel of the electric bicycle connected to the motor unit 10 do not rotate. The rotor is fixed on the stator U by the magnetic flu. The user may set a first set value in the controller 20, and may set 50 A or more as the first set value.

In addition, the controller 20 may control the magnitude of the q-axis current of the motor unit 10 to be a second set value. When the magnitude of the q-axis current is the second set value, no rotation torque is generated in the motor unit 10, and the rotation shaft or the rotor of the motor does not rotate. Accordingly, the wheel of the electric bicycle do not rotate by the driving of the motor (rotation torque of the motor).

The controller 20 may prevent the q-axis current of the motor unit 10 from being applied. The user may set the second set value in the controller 20 and may set 0 as the second set value.

The controller 20 may determine that the electric bicycle is moving, and in a state of operating the alarm and locking the wheel of the electric bicycle, may detect whether the sensor value of the sensor unit 11 is greater than a predetermined set value (specifically, a third set value). Here, the predetermined set value (third set value) may be a position value (rotation angle value) of the rotation shaft or the rotor of the motor unit 10. The user may set a predetermined set value (third set value) in the controller 20. According to an example embodiment of the present disclosure, the predetermined set value (third set value) may be 10 degrees (rotation angle) or less.

Specifically, when it is detected that the sensor value of the sensor unit 11 is equal to the third set value (e.g., 10 degrees) or greater than the third set value (e.g., 10 degrees), the controller 20 may determine that an external force is continuously applied to the electric bicycle so that the electric bicycle moves (so that the wheel of the electric bicycle rotates), continue to operate the alarm, and continuously lock the wheel of the electric bicycle by continuously maintaining the magnitudes of the d-axis current and the q-axis current of the motor unit 10 at predetermined values. The magnitude of the d-axis current of the motor unit 10 continues to be maintained at the first set value, and the magnitude of the q-axis current continues to be maintained at the second set value, so that magnetic flux continues to be generated in the stator U-phase winding, and the position value (rotation angle value) of the rotation shaft or the rotor of the motor unit 10 is maintained at 0 degrees. Since the controller 20 continues to control the magnitudes of the d-axis current and the q-axis current of the motor unit 10 to become predetermined values, the wheel of the electric bicycle remains locked and may not rotate.

The wheel lock cancelling operation S400 refers to an operation of cancelling the alarm operation and the wheel lock, when the controller 20 detects that the sensor value of the sensor unit 11 is smaller than the third set value (e.g., 10 degrees) in the alarm operating and wheel locking operation S300.

Specifically, when it is detected that the sensor value of the sensor unit 11 is smaller than the third set value (e.g., 10 degrees), the controller 20 may determine that no external force is applied to the electric bicycle, and may cancel the alarm operation and the wheel lock.

The electric bicycle theft prevention control method of the electric bicycle theft prevention system according to an example embodiment of the present disclosure includes, in addition to the above description, a method in which the above-described electric bicycle theft prevention system prevents theft of an electric bicycle.

The above-described electric bicycle theft prevention system and the control method thereof according to example embodiments of the present disclosure may prevent theft even when a user does not have a separate external locking device on the electric bicycle.

In addition, it is possible to prevent the user from causing material damage and mental damage due to theft of the electric bicycle.

Features, structures, effects, etc., described in the above example embodiments are included in at least one example embodiment of the present disclosure, and are not necessarily limited to only one example embodiment. Furthermore, the features, structures, effects, etc., illustrated in each example embodiment may be combined or modified for other example embodiments by those skilled in the art to which the example embodiments belong. Accordingly, the contents related to such combinations and modifications should be interpreted as being included in the scope of the present disclosure.

In addition, while example embodiments have been mainly described in the above, they are intended merely to present specific examples, but are not intended to limit the scope of the present disclosure, and it will be apparent to those skilled in the art that various modifications based on the technical spirit of the present disclosure, as well as the disclosed example embodiments, can be made. in other words, each component specifically shown in the example embodiment can be implemented by modification. Therefore, the differences related to these modifications and applications should be construed as being included in the scope of the present disclosure defined in the appended claims.

EXPLANATION OF SYMBOLS

10: Motor unit
11: Sensor unit
20: Controller
30: Electricity storage unit
40: Alarm unit

What is claimed is:

1. An electric bicycle theft prevention system for preventing theft of an electric bicycle, comprising:
    a motor unit which is a permanent magnet synchronous motor (PMSM) and configured to rotate wheels of the electric bicycle by receiving power from an electric storage unit;
    a sensor unit mounted in the motor unit and configured to detect a rotation angle of a rotation shaft or a rotor of the motor unit; and
    a controller configured to control the motor unit and the sensor unit,
    wherein the controller is configured to:
    when a theft prevention function is activated in an unused state of the electric bicycle, monitor a sensor value of the sensor unit to detect a movement of the electric bicycle,
    when the electric bicycle is moving in a state that the theft prevention function is activated, control a magnitude of a d-axis current of the motor unit for controlling a magnetic flux of the motor unit to be a first set value and a magnitude of a q-axis current of the motor unit for controlling torque of the motor unit to be a second set value,
    when the controller detects that the sensor value of the sensor unit is less than a third set value, determine that the electric bicycle is not moving and continue to monitor the sensor value of the sensor unit, and
    when the controller detects that the sensor value of the sensor unit is equal to or greater than the third set value, determine that the electric bicycle is moving and set 0 as the second set value,
    wherein the third set value is adjustable by a user of the electric bicycle.

2. The electric bicycle theft prevention system of claim 1, further comprising an alarm unit configured to generate an alarm by an electrical signal of the controller,
    wherein, when the controller detects that the sensor value of the sensor unit is equal to or greater than the third set value, the controller makes the alarm unit generate the alarm.

3. The electric bicycle theft prevention system of claim 2, wherein the controller detects whether the sensor value of the sensor unit is greater than a the third set value, and when it is detected that the sensor value of the sensor unit is equal to the third set value or greater than the third set value, the controller determines that an external force is continuously applied to the electric bicycle and makes the alarm unit continuously generate the alarm.

4. The electric bicycle theft prevention system of claim 3, wherein, when the alarm is continuously generated, the controller controls so that the magnitude of the d-axis current of the motor unit is continuously maintained at the first set value, and controls so that the magnitude of the q-axis current of the motor unit is continuously maintained at the second set value.

5. The electric bicycle theft prevention system of claim 2, wherein the controller detects whether the sensor value of the sensor unit is greater than the third set value, and when it is detected that the sensor value of the sensor unit is smaller than the third set value, the controller determines that no external force is applied to the electric bicycle and cancels an alarm operation and wheel lock.

6. The electric bicycle theft prevention system of claim 1, wherein a d-axis of the d-axis current is orthogonal to a q-axis of the q-axis current.

7. An electric bicycle theft prevention control method of an electric bicycle theft prevention system for preventing theft of an electric bicycle, comprising:
 a theft prevention function activating operation, in which a theft prevention function of the electric bicycle is activated by a user in an unused state of the electric bicycle;
 an electric bicycle movement detecting operation, in which a controller monitors a sensor value of a sensor unit to detect a movement of the electric bicycle after the theft prevention function is activated;
 an alarm operating and wheel locking operation, wherein, when the controller determines that the electric bicycle is moving in the electric bicycle movement detecting operation, an alarm is operated and wheels of the electric bicycle are locked; and
 an alarm operation and wheel lock cancelling operation, wherein the controller detects whether the sensor value of the sensor unit is greater than a predetermined set value in the alarm operating and wheel locking operation, and when it is detected that the sensor value of the sensor unit is smaller than the predetermined set value, the alarm operation and wheel lock are cancelled,
 wherein the controller is configured to:
 when the electric bicycle is moving in a state that the theft prevention function is activated, control a magnitude of a d-axis current of a motor unit for controlling a magnetic flux of the motor unit to be a first set value and a magnitude of a q-axis current of the motor unit for controlling torque of the motor unit to be a second set value,
 when the controller detects that the sensor value of the sensor unit is less than a third set value, determine that the electric bicycle is not moving and continue to monitor the sensor value of the sensor unit, and
 when the controller detects that the sensor value of the sensor unit is equal to or greater than the third set value, determine that the electric bicycle is moving and set 0 as the second set value,
 wherein the third set value is adjustable by a user of the electric bicycle.

8. The electric bicycle theft prevention control method of claim 7, wherein in the alarm operating and wheel locking operation,
 when the alarm is operated, the controller controls the magnitudes of the d-axis current and the q-axis current of the motor unit to be predetermined values.

9. The electric bicycle theft prevention control method of claim 8, wherein the controller detects whether the sensor value of the sensor unit is greater than the third set value, and when it is detected that the sensor value of the sensor unit is equal to the third set value or greater than the third set value, the controller determines that an external force is continuously applied to the electric bicycle and continuously generates the alarm.

10. The electric bicycle theft prevention control method of claim 7, wherein in the alarm operation and wheel lock cancelling operation,
 the controller detects whether the sensor value of the sensor unit is greater than the third set value, and when it is detected that the sensor value of the sensor unit is smaller than the third set value, the controller determines that no external force is applied to the electric bicycle, and cancels the alarm operation and wheel lock.

11. The electric bicycle theft prevention control method of claim 7, wherein a d-axis of the d-axis current is orthogonal to a q-axis of the q-axis current.

* * * * *